United States Patent [19]

Sussman

[11] 4,021,945
[45] May 10, 1977

[54] LIQUID CRYSTAL DEVICE WITH LOUVER MEANS LOCATED BEHIND THE LIQUID CRYSTAL DEVICE

[75] Inventor: Alan Sussman, Princeton, N.J.

[73] Assignee: RCA Corporation, New York, N.Y.

[22] Filed: July 26, 1971

[21] Appl. No.: 166,192

Related U.S. Application Data

[63] Continuation-in-part of Ser. No. 852,664, Aug. 25, 1969, abandoned.

[52] U.S. Cl. .............................. 40/28 C; 40/130 R; 350/160 LC; 350/267
[51] Int. Cl.² ...................... G02F 1/34; G02F 1/30; G09F 13/06
[58] Field of Search ............ 350/160 LC, 161, 267; 356/238; 40/130 R, 28 C

[56] References Cited

UNITED STATES PATENTS

| 3,401,267 | 9/1968 | Engle et al. ....................... 356/238 |
| 3,499,112 | 3/1970 | Heilmeier et al. ................. 350/160 |

*Primary Examiner*—John F. Pitrelli
*Assistant Examiner*—V. P. McGraw
*Attorney, Agent, or Firm*—Carl L. Silverman; Albert Russinoff; Glenn H. Bruestle

[57] ABSTRACT

A display device comprises a pair of transparent substrates sandwiching therebetween a liquid crystal material which is reversibly switchable between transparent and forward light scattering states. Disposed behind the device, between it and a source of illumination, is a louver means comprising a plurality of elongated vanes of a dull black, light absorbent color. The louver is so disposed relative to a viewer of the device and the source of illumination as to provide a continuous, black background for the device.

8 Claims, 4 Drawing Figures

INVENTOR.
Alan Sussman
ATTORNEY

INVENTOR.
Alan Sussman
BY M. Y. Epstein
ATTORNEY

LIQUID CRYSTAL DEVICE WITH LOUVER MEANS LOCATED BEHIND THE LIQUID CRYSTAL DEVICE

CROSS-REFERENCE TO RELATED APPLICATION

This is a continuation-in-part of application Ser. No. 852,664 filed Aug. 25, 1969, and now abandoned.

BACKGROUND OF THE INVENTION

This invention relates to display devices, and particularly to display devices employing liquid crystal light scattering means.

Display devices employing liquid crystal light scattering means are known, and are described, for example, in U.S. Pats. No. 3,332,485, issued to R. Williams, on May 30, 1967, and 3,499,122, issued to Heilmeier et al., on Mar. 3, 1970. In these devices, a light scattering means, such as a nematic liquid crystal compound, is used which has the property of being either substantially transparent to light in one state, or being forward scattering of light in another state, the states being reversibly switchable.

One type of liquid crystal device comprises a pair of tansparent substrates, a liquid crystal material sandwiched between the substrates, and conductive transparent electrodes on the inside surfaces of the substrates. In order to efficiently utilize the forward scattering characteristic of the liquid crystal material, the device is disposed between a source of illumination and the viewer. This arrangement provides bright displays and high contrast ratios between various portions of the displays.

A problem with this arrangement, however, when the device is disposed directly between the viewer and the light source, is that the light source is visible to the viewer when the liquid crystal material is in its transparent state. In some instances, this can be disturbing.

In another application, the light source is disposed out of the line of sight of the viewer. A disadvantage of this arrangement, however, is that it is somewhat difficult to provide uniform and efficient lighting of the device while providing devices of comparatively small size.

DESCRIPTION OF A PREFERRED EMBODIMENT

Figure 1:
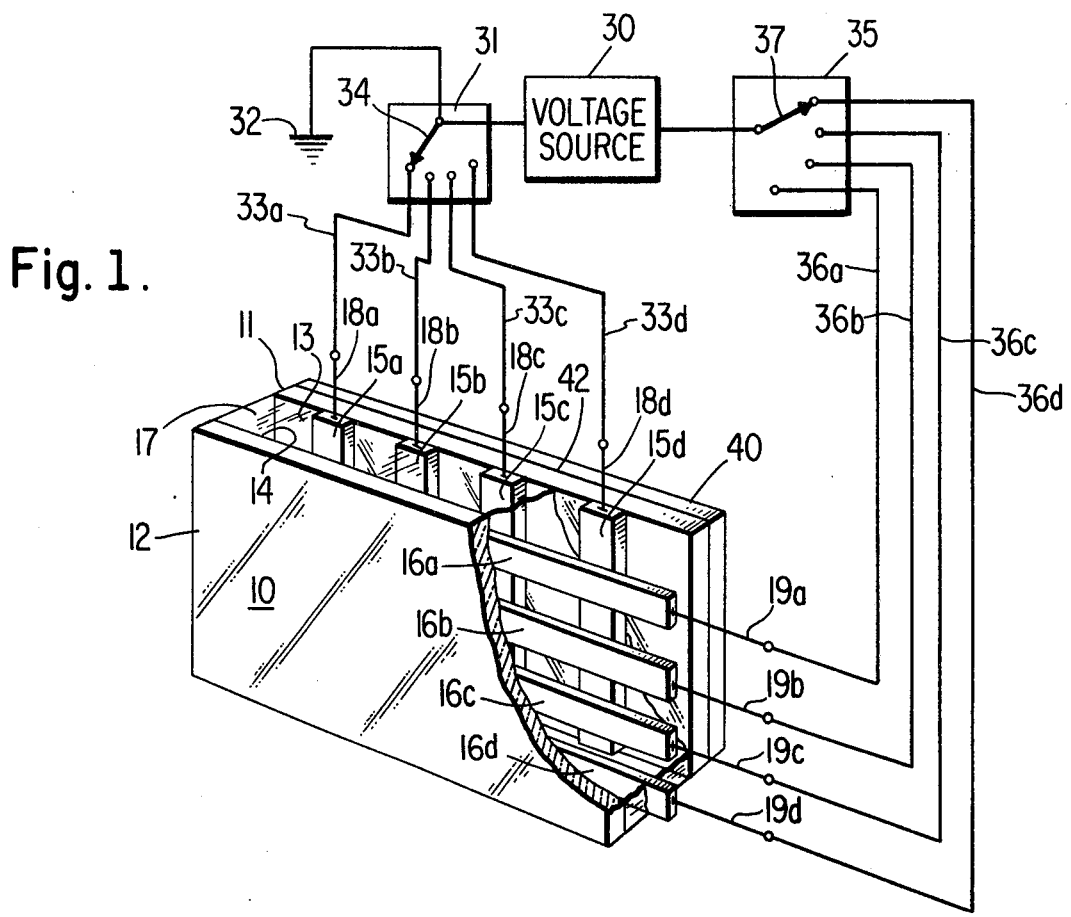
FIG. 1 is a perspective, partially cut-away view of a display device embodying the invention, and a schematic representation of a circuit for operating the device.

With reference to FIG. 1, a display device 10 is shown comprising back and front transparent glass support plates 11 and 12, respectively. The two plates 11 and 12 have essentially parallel inner faces 13 and 14, respectively, that are separated by a distance in the range of about 5 to 30 micrometers. The back plate 11 supports, on its inner face 13, an array of parallel spaced transparent conductive back electrode strips 15a, 15b, 15c, and 15d. In this example, only four back strips are shown, but a much larger number of electrode strips can be used. The front plate 12 supports, on its inner face 14, an array of parallel spaced transparent conductive front electrode strips, 16a, 16b, 16c, and 16d. The front strips 16 are substantially perpendicular to the conductive back strips 15a–15d. Again, only four front strips are shown, but a much larger number can be used. The conductive strips can comprise, for example, tin oxide.

The space between the back and front plates 11 and 12 is filled with a film 17 (FIG. 2) of a liquid crystal light modulating medium which is substantially transparent to light in one state and which is forward scattering of light in another state. Various liquid crystals having such operating states, and means for switching back and forth between these states are known; see, for example, the cited U.S. patents.

In the instant embodiment, the light modulating film 17 comprises a nematic liquid crystal composition of the type that exhibits turbulent motion upon the passage of electric current therethrough, for example, the liquid crystal anislidene-p-aminophenylacetate, having an excess of mobile ions therein. Spacer means, not shown, are disposed between and bonded to the support plates 11 and 12 to maintain the spacing between the support plates and to retain the liquid crystal material between the plates.

The device 10 includes connection means 18a to 18d and 19a to 19d for applying a voltage to the conductive back electrodes 15a to 15d and to the conductive front electrodes 16a to 16d, respectively.

FIG. 1 also includes a schematic representation of a circuit for operating the display device 10. The circuit includes a back strip commutator switch 31 having its common contact connected to one side of a voltage source 30 and to round 32. A plurality of commutator contacts of the switch 31 are connected to the back strip connecting means 18a to 18d through leads 33a to 33d. Also, a front strip commutator switch 35 is provided which has a plurality of commutator contacts connected to the front strip connecting means 19a to 19d through leads 36a to 36d and a common contact connected to the other side of the voltage source 30.

The device 10, to the point presently described, is known. The device operates as follows. The liquid crystal film 17 is normally substantially transparent to light. However, when an electric field of sufficient magnitude is applied across the film, the film changes from its tramsparent state to its forward light scattering state. Thus, in the instant device, when a voltage of sufficient magnitude is applied between a back electrode strip and a front electrode strip, such as, for example, between electrode strips 15a and 16d via the connecting means 18a and 19d respectively, the film 17 in the volume defined by the intersection of the energized electrode strips is affected by the current caused to flow across it. This voltage and current flow causes turbulence in the film in this volume and places it in a light scattering state, i.e., it forward scatters light incident thereon. The threshold voltage required to obtain this effect is generally in the range of $0.5 \times 10^4$ to $1 \times 10^4$ volts per centimeter of film thickness. The applied voltage can be, for example, A.C., D.C., or pulsed D.C.

By sequentially energizing more than one electrode strip from each set, a plurality of predetermined areas are thus rendered light scattering. By applying a source of light to the device 10, in a manner described hereinafter, the light scattering areas are rendered brighter or luminous in comparison with other areas of the film which are not energized and which are transparent to the light. Scanning techniques known to the mural television art may be utilized to sequentially and cyclicly energize the conductive strips and to modulate the amplitude of the voltage source. In this manner, various types of information can be optically displayed. Furthermore, by having a large number of closelyspaced electrode strips on each plate, for example, electrode strips that are of the order of 1 mil wide and spaced one-half mil apart, a picture can be displayed on a device of this type. Also, the percent of light scattered, and hence the degree of illumination of each element, can be modulated by controlling the magnitude of the applied voltage above the threshold, thereby affording a grey scale. Alternatively, a fixed display can be generated by simultaneously energizing a plurality of selected electrode strips.

Figure 2:
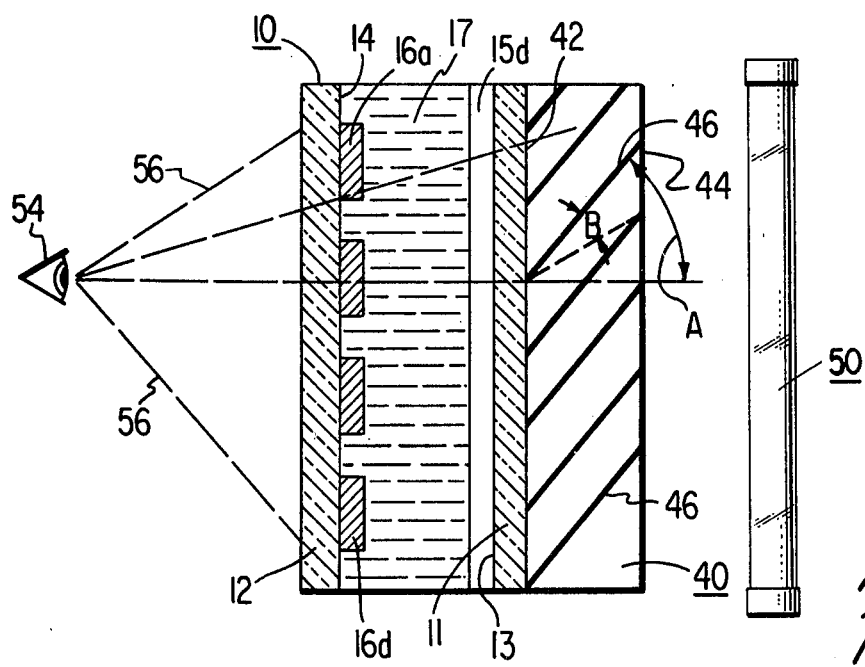
FIG. 2 is a sectional view of the device shown in FIG. 1 illustrating the use of the device.

Returning now to a consideration of the structural features of the device 10, a louver means 40 is provided mounted on the outside surface 42 of the rear plate 11, as shown in FIGS. 1 and 2.

By "louver means" is meant a plurality of vanes which are generally, but not necessarily, parallel to one another, and which project outwardly away from the rear plate 11 of the device. In general, the louver means can comprise any arrangement of individual vanes which can be attached by suitable means either to or adjacent to the rear plate 11.

In the instant embodiment, the louver means 40 comprises a film 44 of a transparent plastic having embedded therein a plurality of spaced, parallel, opaque layers 46 extending from front to back of the film 44 and elongated in a direction parallel to the surface 42 of the plate 11 (into the paper, as viewed in FIG. 2). The elongated layers 46 are comparable to the individual slats or vances of a louver, but have the advantage, in comparison with a conventional louver, of having small dimensions. In the instant embodiment, for example, the film 44 has a thickness of 40 mils, the layers 46 are disposed at 25 layers to the inch, and the layers have a thickness of 2 mils each. The layers 46 are disposed at a 45° angle with respect to the plane of the surface 42 of the plate 11.

The louver film 44 is commercially available from the Minnesota Mining and Manufacturing Company, and is known as "Light Control Film".

In operation of the device 10, a light source 50, such as a fluorescent tube, is disposed behind the device. The light source 50 illuminates the device 10 through the rear side thereof, but, owing to the presence of the louver means 40, only those light rays which are substantially parallel to the louver layers 46 pass between the layers to reach the device.

An observer 54 views the device along directions 56, none of which is parallel to the louver vanes 46. Thus, while the device 10 is illuminated by the light source 50, the source is not visible to the viewer.

It will be appreciated that there are any number of relative dispositions of the louver means 40 (including variations of the thickness of the film 44, and the angles and spacings of the vanes 46), the light source 50, and the viewing directions 56 of the device to provide illumination of the device while more or less shielding the light source from the viewer. In general, however, a more attractive display, having a more uniform appearance, is provided when the layers 46 of the louver are so arranged relative to the viewer as to overlap and provide a continuous opaque background. This condition is achieved when the angle A (FIG. 2) formed by the device viewing directions 56 and the plane of each louver vane 46 is greater than the angle B formed by the plane of each louver vane 46 and a line joining the front and rear edges of adjacent vanes.

Additionally, the vanes 46 are preferably of a light absorbent, dull black color, whereby little light is reflected from the vanes, and the vanes are substantially non-luminous.

When areas of the light modulating film 17 are not energized, these areas are substantially transparent, and the louver means 40 is visible to the viewer. Since the louver layers 46 are preferably non-reflecting and black, little of the light from the source 50 reaches the viewer, and the non-energized areas of the device appear black.

When various areas of the film 17 are switched to the light scattering state, by applying a suitable voltage thereacross, the light incident upon these areas through the louver means 40 is forward scattered, and some of the light reaches the viewer. The areas in the light scattering state thus appear luminous or milky white in comparison with the black background visible through the transparent areas of the film 17.

An advantage of the present device is that excellent light contrast, substantially independent of the level of ambient light, is obtainable between the areas in the light scattering state and the areas in the transparent state. This results because the light absorbent louver layers, when visible to the viewer, appear substantially equally black regardless of the amount of light falling on the layers from ambient light sources.

A further advantage is that because the louver means 50 serves to occlude vision of the light source, the light source can be disposed directly behind the device, thus conserving space.

Figure 3:
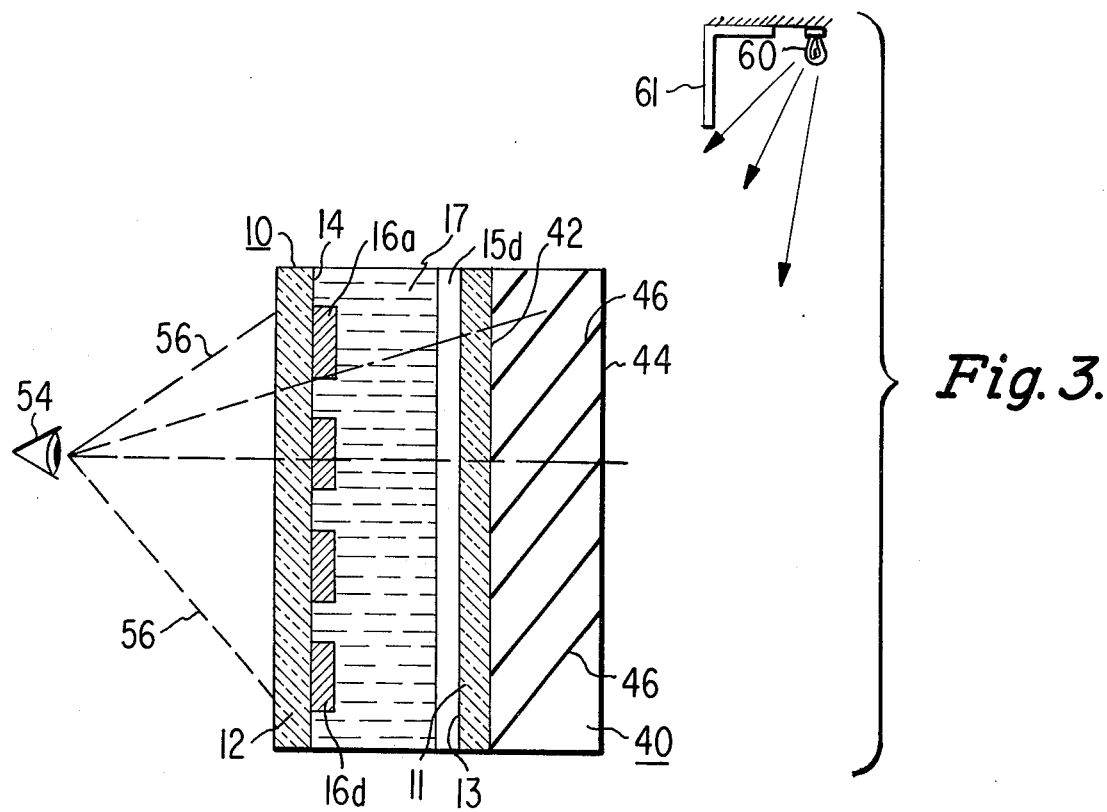
FIGS. 3 and 4 are views similar to that of FIG. 2 but showing different ways in which the device can be used.

In another embodiment of the invention, shown in FIG. 3, a light source 60 for the device 10 is disposed above and behind the device and behind a light shield 61. Thus, the light source 60 is not visible to the viewer and, with respect to preventing vision of the light source through the device by the viewer, the louver 40 is not required. The louver 40 is still useful, however, to provide a continuous, preferably black, background for the device. As described above, this improves the appearance of the device and provides good light contrast substantially independent of the level of the ambient light.

Figure 4:
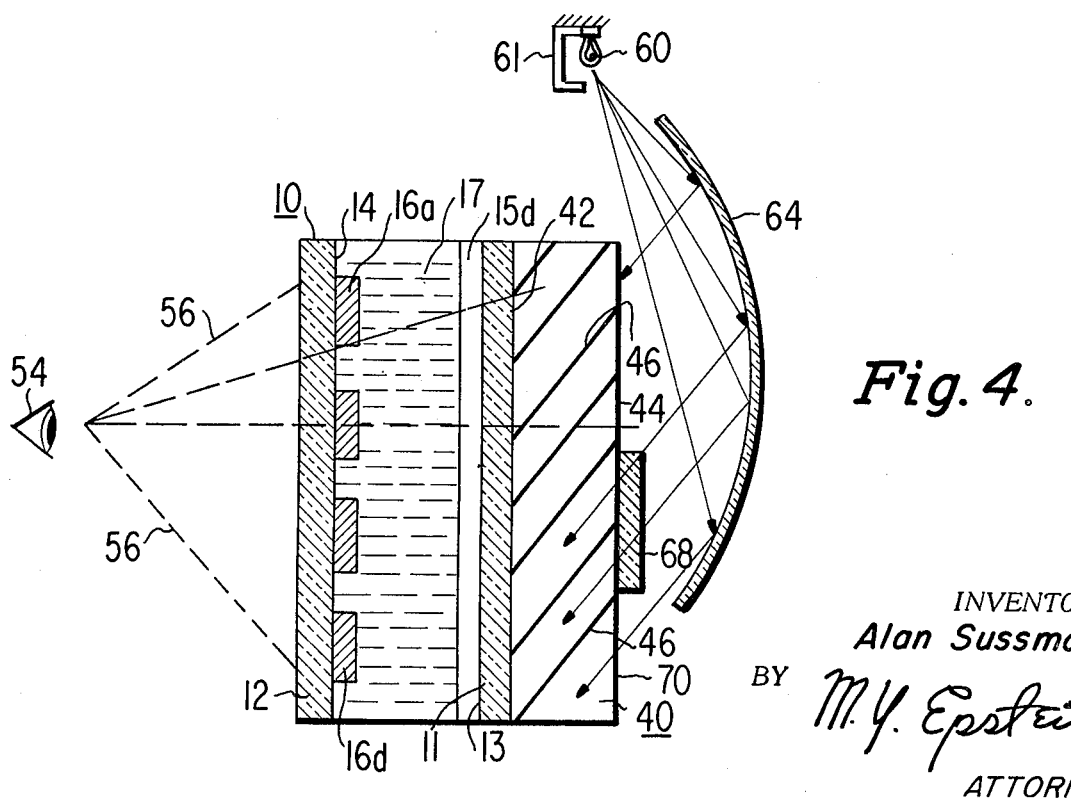

In another embodiment of the invention, shown in FIG. 4, the light source 60 is used in combination with a light reflector 64 for the purpose of providing a collimated light for the device. To this end, the light source 60 is preferably a "point" source of light, e.g., a lamp bulb having a small filament. The use of collimated light is desirable when colored images are displayed. Thus, for example, by disposing a light filter 68 of a desired configuration, e.g., a solid circle, on a surface of the louver film 44, preferably the rear surface 70, the light passing through the filter 62 is colored.

In operation of this embodiment, when the portions of the liquid crystal film 17 in the path of light through the filter 68 are not light scattering, the light does not reach the viewer. Since the filter 68 is preferably disposed behind the louver 40, the continuous opaque surface presented to the viewer by the louver 40 blocks vision of the filter 68. When the portions of the liquid crystal film 17 in the path of light through the filter 68 are in the light-scattering state, however, some of the light through these portions is forward scattered in directions towards the viewer, in which case a colored image is displayed.

The purpose of using collimated light is to provide colored images having sharply defined edges.

Using collimated light, it is preferable to direct the light from the reflector 64 in directions parallel to the vanes 46 of the louver 44. A reason for this is that most of the light from the reflector 64 passes through the louver 40 and is available to illuminate the device 10. This increases the efficiency of the device.

Although, in this embodiment, the light is directed in paths parallel to the louver vanes 46, and thus away from the viewer, as shown in FIG. 4, the presence of the louver 40 is important to prevent vision by the viewer of the "secondary" light source for the device 10, i.e., the reflector 64. This is desirable since, in the absence of the louver 40, owing to substantially unavoidable imperfections in the reflective surface of the reflector 64, some of the light from the reflector would be directed towards the viewer with the result that the reflector 64 would be visible as a shiny, silvery background of the device 10. Such a silvery background is generally undesirable as it tends to lower the contrast ratio of the device.

I claim:

1. A display device comprising a liquid crystal cell reversibly switchable between light transparent and light scattering states, said cell being designed to be viewed along directions intersecting a front surface thereof;
    a louver means disposed adjacent to a rear surface of said cell and being effective to allow illumination of said cell by light incident onto said rear surface only along directions different from said viewing directions, whereby, when said cell is in its transparent state, the passage of light along said viewing directions is prevented;
    said cell being effective, when in its light scattering state, to direct light incident onto said rear surface along said viewing directions.

2. A display device as in claim 1 wherein said louver means comprises a plurality of elongated vanes projecting outwardly from said cell rear surface, said vanes being of a non-reflective, light absorbent color, and presenting, when viewed along said viewing directions, a continuous dark background for said device.

3. A display device comprising a liquid crystal cell reversibly switchable between light transparent and light scattering states, said cell being designed to be viewed along directions intersecting a front surface thereof;
    a louver means disposed adjacent to a rear surface of said cell and being effective to allow light from a light source disposed adjacent to said rear surface and in the path of said viewing directions to illuminate said rear surface only along directions different from said viewing directions, whereby, when said cell is in its transparent state, the passage of light along said viewing directions is prevented;
    said cell being effective, when in its lights scattering state, to direct light incident onto said rear surface along said viewing directions.

4. A display device as in claim 3 wherein said louver means comprises a plurality of elongated vanes projecting outwardly from said cell rear surface, said vanes being of a non-reflective, light absorbent color, and presenting, when viewed along said viewing directions, a continuous dark background for said device.

5. A display device comprising a liquid crystal cell reversibly switchable between light transparent and light scattering states, and
    a louver disposed adjacent to a rear surface of said cell, said louver including a plurality of elongated vanes projecting outwardly from said cell rear surface and being effective to allow illumination of said rear surface by light rays traveling only in directions substantially parallel to the directions of projection of said vanes;
    said cell being effective, when in its light scattering state, to change the directions of travel of light incident onto said cell through said louver.

6. A display device as in claim 5 wherein said vanes are opaque and are of a non-reflective, light-absorbent color.

7. A display device comprising:
    a sheet of louvered material having a plurality of generally parallel thin opaque louvers set in a transparent matrix at an angle to the faces of said sheet, said louvers being spaced with opposed edges of adjacent louvers at least contacting a single plane normal to said faces to prevent transmission of light striking said sheet perpendicular to said faces,
    a light source positioned to one side of said sheet of louvered material to direct light through said matrix between said louvers along paths generally parallel to said louvers, and
    an article to be displayed positioned on the opposed side and parallel to said sheet of louvered material to be illuminated by radiation from said light source passing through said matrix between said louvers, said article including a differential pattern of light diffusive and transparent areas defining the indicia to be displayed and said differential pattern being at least partially of contrasting coloration to said opaque louvers so that differential pattern is visible both from ambient light and under illumination.

8. A display device comprising:
    a sheet of louvered material having a plurality of generally parallel thin opaque louvers set in a transparent matrix at an angle to the faces of said sheet, said louvers being spaced with opposed edges of adjacent louvers at least contacting a single plane normal to said faces to prevent transmission of light striking said sheet perpendicular to said faces,
    a light source positioned to one side of said sheet of louvered material to direct light through said matrix between said louvers along paths generally parallel to said louvers, and
    a nematic liquid crystal display device positioned on the opposed side of and parallel to said sheet of louvered material to be illuminated by radiation from said light source passing through said matrix between said louvers, said liquid crystal display device providing a differential pattern of light diffusive and transparent areas defining the indicia to be displayed visible both from ambient light and under illumination.

* * * * *

UNITED STATES PATENT OFFICE
CERTIFICATE OF CORRECTION

PATENT NO. : 4,021,945

DATED : May 10, 1977

INVENTOR(S) : Alan Sussman

It is certified that error appears in the above-identified patent and that said Letters Patent are hereby corrected as shown below:

| Column 1 | Line 16 | "3,332,485" should be --3,322,485-- |
| | Line 17 | "3,499,122" should be --3,499,112-- |
| Column 3 | Line 34 | "vances" should be --vanes-- |

Signed and Sealed this nineteenth Day of July 1977

[SEAL]

Attest:

RUTH C. MASON
*Attesting Officer*

C. MARSHALL DANN
*Commissioner of Patents and Trademarks*